United States Patent [19]

Rikuta

[11] Patent Number: 4,592,383
[45] Date of Patent: Jun. 3, 1986

[54] CONSTANT-FLOW VALVE

[76] Inventor: Sotokazu Rikuta, c/o Nippon Flow Cell Seizo Kabushiki Kaisha, 1-24-15, Shingashi, Itabashi-ku, Tokyo, Japan

[21] Appl. No.: 679,955

[22] Filed: Dec. 10, 1984

[30] Foreign Application Priority Data

May 16, 1984 [JP] Japan .................. 59-098169

[51] Int. Cl.$^4$ .................................. G05D 7/01
[52] U.S. Cl. .................. 137/454.6; 137/504; 137/514.7
[58] Field of Search ............ 137/454.6, 501, 504, 137/514.7

[56] References Cited

U.S. PATENT DOCUMENTS

| 419,447 | 1/1890 | Hussey | 137/514.7 |
| 1,907,162 | 5/1933 | Webb | 137/504 |
| 2,832,371 | 4/1958 | LaBour | 137/504 |
| 3,156,262 | 11/1964 | Attebo | 137/504 X |
| 3,741,242 | 6/1973 | Hansen | 137/504 |

Primary Examiner—Robert G. Nilson
Attorney, Agent, or Firm—Jordan and Hamburg

[57] ABSTRACT

A constant flow valve includes a valve body having an inlet portion, an outlet portion and a main valve body portion, the inlet portion and the outlet portion being connectable within the run of a fluid pipe line. The main valve body portion is interposed between the inlet portion and the outlet portion and has an open end, a cap member on the open end, and valve means disposed in the main valve body portion for maintaining a constant flow rate through the valve body means regardless of pressure differential between the inlet portion and the outlet portion. The valve means and the main valve body portion are constructed and arranged such that the valve means is removable from and replaceable in the main valve body portion by removing the cap member from the main valve body portion by passing the valve means through the open end of the main valve body portion, the valve means being removable from and replaceable in the main valve body portion while the valve body means remains connected within the run of the fluid pipe line.

11 Claims, 2 Drawing Figures

CONSTANT-FLOW VALVE

DETAILED DESCRIPTION OF THE INVENTION

This invention relates to a constant-flow valve in which even when the variation in pressure differential between upstream and downstream pressures takes place, an inner valve moves automatically and proportionately to the variation in pressure differential thereacross to thereby maintain a predetermined rate of flow of fluid through the valve, and more particularly concerns a constant-flow valve in which essential members related to the inner valve can be removed and reinstalled, as required, with the valve body still interposed within the run of a pipe line.

This invention provides a constant-flow valve which includes: a valve body 1 connected to intake and discharge pipes 33, 34 within the run of a pipe line; a cylinder 7 mounted removably within a main valve body 1' of the valve body 1 and housing a valve stem 14 which is fitted rigidly with an inner valve 27, as well as essential members related thereto; and a cap member 6 removably mounted on top iof the main valve body 1'; whereby detaching the cap member 6 at proper times permits the removal of the cylinder 7 housing the essential members, to thereby facilitate such maintenance operations as the inspection, cleaning, disassembly, reassembly, etc., and also the adjustment of the flow-rate setting.

A conventional constant-flow valve built by combined use of a flow restrictor and an inner valve has a drawback of unsteady accuracy of flow control due to vigorous vibrations of an inner valve caused by changes in the fluid flow on account of the fact that the inner valve is attached directly to a spring. Furthermore, an exact control of fluid flow cannot be expected from a constant-flow valve of this type, since either dirt particles adhere to the spring or the vibrations of the spring take place owing to the fact that the inner valve and related parts are positioned directly within a passageway for the fluid. In this case, either replacing the inner valve and related parts with new ones or repairing them requires much trouble such that the whole valve is removed from the run of a pipe line, and then either the required exchange is made, or the required repair and cleaning are effected, followed by installment of the whole valve back in its place within the run of the pipe line. In order to change the flow-rate setting, the whole valve must be replaced with another valve of the desired, different flow-rate.

Such difficulties have been overcome by the constant-flow valve of the invention which is constructed to remove, as required, a cap member mounted removably on top of the main valve body of a valve body with the valve body still interposed within the run of a pipe line to thereby facilitate the removal both of a cylinder which is mounted removably within the main valve body and which houses such essential members as a valve stem having an inner valve, a coil spring etc., and of a flow restrictor which fact permits the members thus removed to be either repaired and cleaned easily or replaced easily with new ones. Therefore, the constant-flow valve of the invention is effective for the maintenance of exact fluid-flow control.

REFERENCE CHARACTERS EMPLOYED IN THE DRAWINGS

| | | | |
|---|---|---|---|
| 1 | Valve body | 14 | Valve stem |
| 1' | Main valve body | 15 | Piston |
| 2 | Inlet pipe | 18 | Coil spring |
| 3 | Outlet pipe | 22 | Strainer |
| 4 | Inlet port | 23 | Cylinder port |
| 5 | Outlet port | 25 | End plate |
| 6 | Cap member | 26 | Center hole |
| 7 | Cylinder | 27 | Inner valve |
| 8 | Perforated elastic sheet | 28 | Flow restrictor |
| 9 | Air-escape hole | 29 | Contoured surface |
| 10 | Tapped hole | 30 | Orifice flow-passage |
| 11 | Air-communication hole | 32 | Leg member |
| 12 | Adjust screw | 35 | Ring metal |

DESCRIPTION OF THE PREFERRED EMBODIMENT

Figure 1:
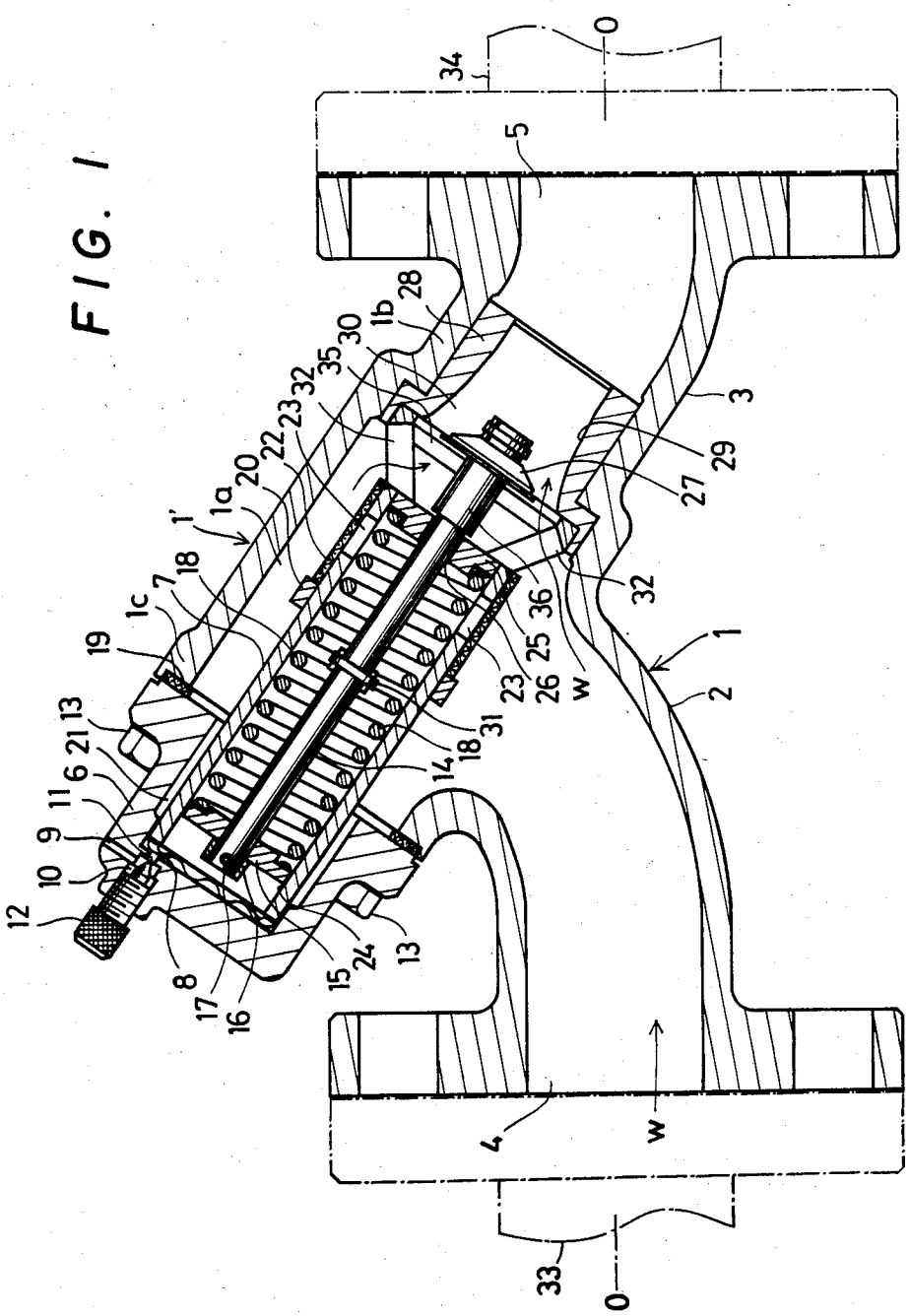
FIG. 1 is a vertical cross-sectional view showing an embodiment of a constant-flow valve according to the invention.
Figure 2:
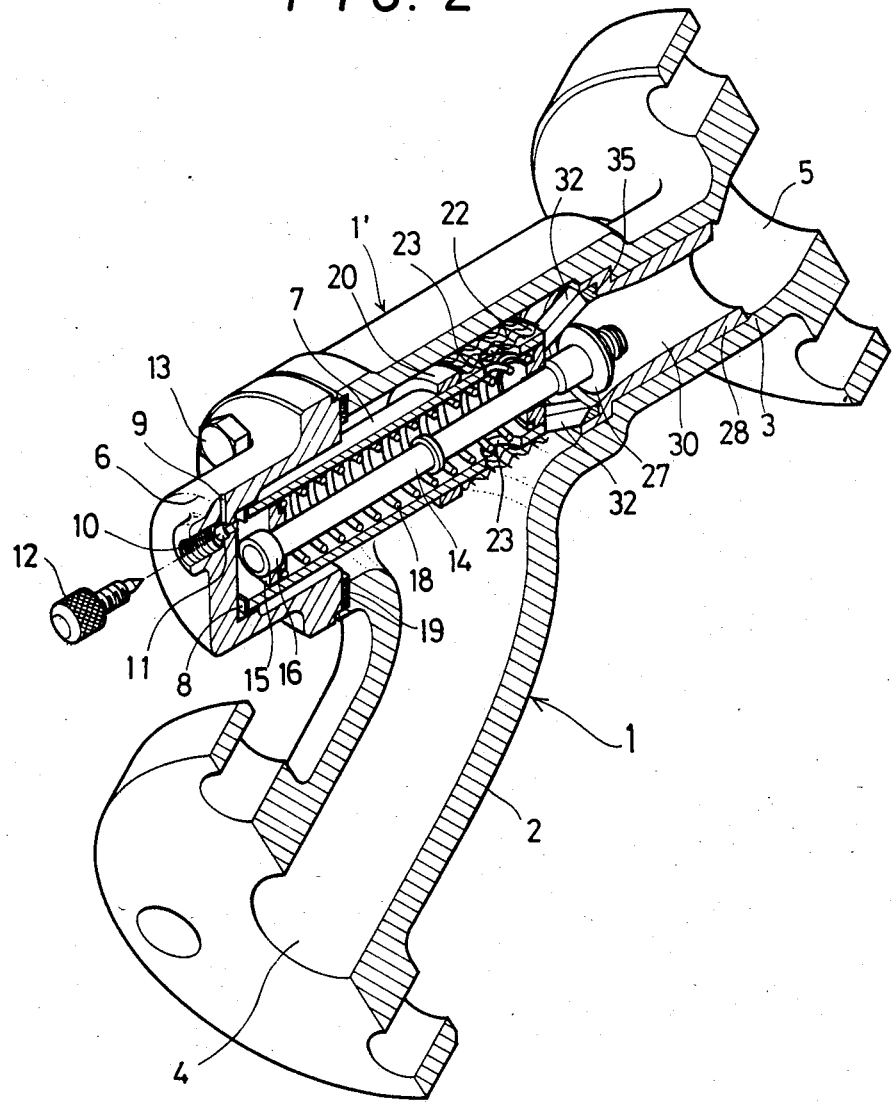
FIG. 2 is a partially cross-sectional and perspective view of the constant-flow valve shown in FIG. 1.

With reference now to the drawings and more particularly to FIG. 1 thereof, there is shown a constant-flow valve of the present invention having a valve body 1 which is interposed between an intake pipe 33 and a discharge pipe 34 within the run of a pipe line for a fluid W. The valve body 1 comprises a main valve body 1', and inlet and outlet pipes 2, 3 which are integral therewith. The inlet pipe 2 having an inlet port 4 and the outlet pipe 3 having an outlet port 5 are curved jointly in a mountain-like form. The main valve body 1' is a hollow cylindrical container and inclined with respect to the centerline O—O of the pipe line. The inside 1a of the main valve body 1' communicates with the inlet pipe 2 at its one side, and its lower end portion 1b constitutes also a portion of the outlet pipe 3. A hollow cylindrical cap member 6 which is closed at its upper end is mounted removably on the upper end 1c of the main valve body 1' with a packing 19 by using assembly bolts 13. A hollow cylinder 7 is mounted removably and coaxially within the hollow cylindrical cap member 6 and also within the main valve body 1'. An end plate 25 having a center hole 26 is fitted tightly and securely into the lower end of the cylinder 7. Within the lower portion of the main valve body 1' there are provided a plurality of leg members 32, each of which is fixed rigidly at one end to the end plate 25 and at the other end to a ring metal 35, to support the cylinder 7. The ring metal 35 tightly and securely engages the inside of a flow restrictor 28 at the upper end thereof by a fit-in or thread method. The cylinder 7 is provided at its lower portion with cylinder ports 23. Each of the cylinder ports 23 is covered with a strainer 22 made of a screen, a porous sheet, etc., which is held to the cylinder 7 with a strainer-retainer 20. Dirt particles or foreign particles attaching themselves to the outer surfaces of the strainers 22 are always washed off therefrom by the fluid stream, and thereby the outer surfaces are always made clean. The lower portion of a valve stem 14 is passed through and borne slidably by the center hole 26 in the end plate 25, and the free end of the valve stem 14 is protruded therefrom. An annular clearance 21 is provided between the portion of larger inner diameter of the cap member 6 and the upper portion of the cylinder 7 positioned therewithin. The upper open-end portion of the cylinder 7 tightly and securely engages the portion of smaller inner diameter of the cap member 6. A perforated elastic sheet 8 acting as a buffer is sandwiched between the extreme upper open end of the cylinder 7 and the under surface of the top portion of the cap member 6. A tapped hole 10 is provided in the top portion of the cap member 6 to receive an adjust screw 12. The tapped hole 10 communicates directly with an air-escape hole 9 as well as with a space accommodating the perforated elastic sheet 8 by means of an air-communication hole 11, and thereby indirectly with the inside of the cylinder 7. The opening or closing of the air-escape hole 9 is asdjusted by turning the adjust screw 12 from the outside. The valve stem 14 is mounted coaxially within the cylinder 7. A piston 15 which is fixed rigidly to the upper end of the valve stem 14 by means of both a locking member 16 and a pin member 17 slides on the interior surface of the cylinder 7 while the piston 15 is acting as a damper. A stopper 31 is fixed rigidly on the valve stem 14 in place in order to prevent an inner valve 27 from jumping out of the flow restrictor 28 when the pressure differential across the inner valve 27 abnormally increases beyond a designed range of the pressure differential. The inner valve 27 is attached rigidly to the free end of the valve stem 14 protruding from the end plate 25 so that the inner valve 27 is positioned in place within a flow restrictor 28. The inner valve 27 has a sleeve 36 whose length is dimensioned in such a way that, when no fluid is flowing through the valve, its upper end comes in touch with the under surface of the end plate 25 acting also as a stopper. A coil spring 18 is mounted coaxially within the cylinder 7 around the valve stem 14 between the end plate 25 and the piston 15 functioning also as a spring bearing, and controls the movement of the valve stem 14 proportionately by its spring force. The flow restrictor 28 is engaged tightly and securely but removably with the inside of the lower end portion 1b (a portion of the outlet pipe 3) of the main valve body 1' by a fit-in or thread method. An orifice flow-passage 30 in the flow restrictor 28 is formed with a contoured surface 29 whose diameter decreases gradually from the inlet end to outlet end of the orifice flow-passage 30, and communicates with the outlet port 5.

With the structure thus set forth, a fluid W (either a liquid or a gas) having a pressure flows from the intake pipe 33 through the inlet port 4 of the inlet pipe 2 into the main valve body 1', further flows through an annular passageway between the cylinder 7 and the main valve body 1', past the leg members 32 and through the flow restrictor 28, and then is discharged from the outlet port 5 into the discharge pipe 34. A part of the fluid is filtered through the strainer 22 and flows through the cylinder port 23 into the cylinder 7. The flow of the fluid into the flow restrictor 28 is restricted between the inner valve 27 and the interior contoured surface 29 of the flow restrictor 28, and thereby a pressure differential is created between the opposed faces of the inner valve 27. Therefore the force developed by the pressure differential will cause the inner valve 27 to move downstream, namely toward that portion of the orifice flow-passage or contoured flow-passage 30 where the diameter is smaller, to thereby compress the coil spring 18 within the cylinder 7 until the inner valve 27 will form an area of the orifice of the required cross-sectional area jointly with the flow restrictor 28 to thereby assume a balanced position. At this point the constant-flow valve maintains the rate of flow of fluid therethrough at a substantially constant value. As either the upstream pressure of the fluid increases, for example, from this point, or the downstream pressure of the fluid decreases from this point, the pressure differential created between the opposed faces of the inner valve 27 increases in magnitude and thereby tends to move downstream the inner valve 27 together with the valve stem 14 to thereby compress the coil spring 18 mounted within the cylinder 7. This movement of the inner valve 27 tends to reduce the cross-sectional area of the orifice formed between the inner valve 27 and the flow restrictor 28 to thereby counterbalance the increase so that a substantially constant flow through the flow restrictor 28 will result. On the contrary, as either the upstream pressure of the fluid decreases or the downstream pressure of the fluid increases, the pressure differential created between the opposed faces of the inner valve 27 decreases in magnitude and thereby tends to move upstream the inner valve 27 together with the valve stem 14 to thereby tension the coil spring 18 which movement tends to enlarge the cross-sectional area of the orifice formed between the inner valve 27 and the flow restrictor 28 to thereby counterbalance the decrease so that a substantially constant flow through the flow restrictor 28 will result. As described above, the inner valve 27, together with the valve stem 14, moves either upstream or downstream proportionately to the variation in pressure differential created between the opposed faces of the inner valve 27, thus causing the coil spring 18 to either stretch or contract while being constrained between the end plate 25 and the piston 15 acting as a spring bearing within the cylinder 7. The constant-flow valve according to the invention possesses the advantages of responding instantaneously to changes in the pressure differential and of discharging a fluid from the outlet pipe 3 at a substantially constant rate of flow, since the interior contoured surface 29 of the flow restrictor 28 is designed in combination with the inner valve 27 to be a contoured surface such that a predetermined flow rate will result even when fluctuations in upstream pressure or in downstream pressure or in both take place in a case where the fluid is a liquid, and also even when fluctuations in any one of upstream and downstream pressures take place in a case where the fluid is a gas.

In the construction of the invention the upstream port 23 of the cylinder 7 is covered with the strainer 22 made of a screen or a porous sheet and accordingly the fluid alone which has been made clean by filtration through the strainer 22 flows through the cylinder port 23 into and fills the cylinder 7 and the fluid never flow backward in the cylinder, which prevents dirty or foreign small particles from getting into an annular gap between the sliding surfaces of the cylinder 7 and the piston 15 and also from getting between the sliding surfaces of the valve stem 14 and the center hole 26 through the end plate 25, thus permitting the valve stem 14 and the inner valve 27 to operate very smoothly. The surfaces of the strainer 22 are always in contact with a stream of the fluid; therefore, even if dirt particles or foreign objects stick to the surfaces of the strainers, they are immediately washed away by the fluid flowing through the valve, thus the surfaces of the strainers 22 being kept clean. Since the valve stem 14 is indirectly in contact with the interior wall of the cylinder 7 through the medium of the piston 15, the piston and cylinder 7 acts as a damper in cooperation therewith. This fact prevents both the vibrations of the valve and the possibility of the hunting of the inner valve 27 and also the valve stem 14 even if sudden changes in pressure differential take place, thus keeping the smooth stream of the fluid through the valve. In a case where the fluid flowing through a conventional constant-flow valve is a liquid, the movement of an inner valve becomes unstable when air is present in the liquid flowing into the valve. In contrast to this, in the constant-flow valve of the invention, a cap member 6 mounted removably on top of a main valve body 1' is provided with an air-escape mechanism comprising an air-escape hole 9, an air-communication hole 11, a tapped hole 10 and an adjust screw 12; therefore, the air within a main valve body 1' is permitted to escape with a valve body 1 installed at any desired location and in any position—horizontal, vertical, or at any angle—within the run of a pipe line, which fact makes possible the smooth and accurate movement of an inner valve. In the construction of the invention, essential members such as a cylinder 7, a piston 15, a valve stem 14 having an inner valve 27, and an end plate 25, leg members 32, a ring metal 35, a coil spring 18, strainers 22 and a flow restrictor 28 can be assembled in one set or unit, and a set of the essential members thus assembled can be easily removed from a main valve body 1' by detaching the cap member 6 mounted removably on top thereof. Hence these essential members can be easily inspected, repaired, or cleaned without the need for such troublesome operations as consist of the steps of detaching the whole interposed valve from the run of a pipe line, disassembling it, reassembling it and interposing it again within the run of the pipe line. Furthermore, the adjustment of the flow-rate setting can be easily made simply by replacing a flow restrictor 28 and/or an inner valve 27 with a flow restrictor and/or inner valve of the newly desired flow rate.

In practical application, the constant-flow valve of the invention is operable within the run of any one of horizontal, vertical, and inclined pipe lines; therefore, the valve is excellent in work efficiency as well as in durability, and also covers a very wide range of usage.

What is claimed is:

1. A constant flow valve comprising a valve body means having an inlet portion, an outlet portion and a main valve body portion, said inlet portion and said outlet portion being connectable within the run of a fluid pipe line, said main valve body portion being interposed between said inlet portion and said outlet portion, said main valve body portion having an open end, a cap member on said open end, and valve means disposed in said main valve body portion for maintaining a constant flow rate through the valve body means regardless of pressure differential between said inlet portion and said outlet portion, said valve means and said main valve body portion being constructed and arranged such that said valve means is removable from and replaceable in said main valve body portion by removing said cap member from the main valve body portion by passing said valve means through said open end of said main valve body portion, said valve means being removeable from and replaceable in said main valve body portion while the valve body means remains connected within the run of said fluid pipe line, said main valve body portion having a passage extending from said open end, said passage having an axis extending at an obtuse angle relative to the axis of said outlet portion, said valve means comprising a cylinder means coaxially disposed within said passage of said main valve body portion, said valve means further comprising a valve plate at one end of said cylinder means, said valve plate having a central opening, said valve means further comprising a valve stem movable in said cylinder means and having an inner valve, said valve stem passing through said central opening, said inner valve being disposed outside said cylinder means.

2. A constant flow valve according to claim 1, wherein the axis of said passage extends at an acute angle relative to the axis of said inlet portion.

3. A constant flow valve according to claim 2, wherein said inlet portion and outlet portion have a common axis.

4. A constant flow valve according to claim 1, wherein the other end of said cylinder means protrudes outwardly of said open end of said main valve body portions.

5. A constant flow valve according to claim 4 further comprising securing means for removeably securing said cap member to said main valve body portion, said cap member having a cup-shaped configuration for receiving the protruding end of said cylinder means.

6. A constant flow valve according to claim 1, wherein said valve means further comprises a piston which is rigidly mounted on said valve stem and movable within said cylinder means.

7. A constant flow valve according to claim 6, wherein said valve means further comprises a spring means coaxially disposed around said valve stem and coaxially disposed within said cylinder means, said spring means extending between said end plate and said piston.

8. A constant flow valve according to claim 1, wherein said valve means further comprises a flow restrictor removeably disposed within said main valve body portion, said flow restrictor having a flow passage with which said inner valve on said valve stem cooperates to provide said constant flow therethrough.

9. A constant flow valve according to claim 8, wherein said valve means further comprises a ring member which is mounted on said flow restrictor, snd a plurality of spaced legs extending between said ring member and said valve plate, whereby said plurality of spaced legs support said cylinder means in said main valve body portions.

10. A constant flow valve according to claim 1, wherein said cylinder means has ports in the cylindrical wall thereof, said valve means further comprising strainer means disposed over said ports.

11. A constant flow valve according to claim 1 further comprising adjustable means on said cap member for allowing air to escape therefrom.

* * * * *